US012741598B2

(12) United States Patent
Kasarla

(10) Patent No.: US 12,741,598 B2
(45) **Date of Patent: *Sep. 22, 2026**

(54) VEHICULAR VISION SYSTEM WITH FORWARD-VIEWING CAMERA

(71) Applicant: Magna Electronics Inc., Auburn Hills, MI (US)

(72) Inventor: Nagender Reddy Kasarla, New Hudson, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/950,410

(22) Filed: Nov. 18, 2024

(65) Prior Publication Data

US 2025/0074332 A1 Mar. 6, 2025

Related U.S. Application Data

(63) Continuation of application No. 18/045,484, filed on Oct. 11, 2022, now Pat. No. 12,145,513.

(60) Provisional application No. 63/262,363, filed on Oct. 11, 2021.

(51) Int. Cl.

| | |
|---|---|
| ***B60R 11/04*** | (2006.01) |
| ***B60R 1/04*** | (2006.01) |
| ***H04N 23/54*** | (2023.01) |
| *B60R 11/00* | (2006.01) |

(52) U.S. Cl.

CPC ................ *B60R 11/04* (2013.01); *B60R 1/04* (2013.01); *H04N 23/54* (2023.01); *B60R 2011/0026* (2013.01)

(58) Field of Classification Search

CPC ........................................................ B60R 11/04

See application file for complete search history.

(56) References Cited

U.S. PATENT DOCUMENTS

| | | | |
|---|---|---|---|
| 6,690,268 | B2 | 2/2004 | Schofield et al. |
| 6,824,281 | B2 | 11/2004 | Schofield et al. |
| 7,038,577 | B2 | 5/2006 | Pawlicki et al. |
| 7,480,149 | B2 | 1/2009 | DeWard et al. |
| 7,720,580 | B2 | 5/2010 | Higgins-Luthman |

(Continued)

FOREIGN PATENT DOCUMENTS

| | | | |
|---|---|---|---|
| DE | 102007012993 | A1 | 9/2007 |
| EP | 2902262 | A1 | 8/2015 |

*Primary Examiner* — Frank Johnson

(74) *Attorney, Agent, or Firm* — HONIGMAN LLP

(57) ABSTRACT

A vehicular vision system includes a camera module mounted at mounting structure that mounts at a headliner of a vehicle and that includes a light transmitting portion disposed at a windshield of the vehicle. The camera module includes a camera and circuitry including an image processor that is operable to process image data captured by the camera. The camera views forward of the vehicle through the light transmitting portion of the mounting structure and through the windshield of the vehicle. With the mounting structure mounted at the headliner region of the vehicle, and with the windshield mounted at the vehicle, the windshield is separable from the mounting structure so that the windshield is removable from the vehicle without removing the mounting structure from the vehicle and without affecting mounting of the camera module at the mounting structure.

20 Claims, 3 Drawing Sheets

(56) References Cited

U.S. PATENT DOCUMENTS

| | | | | |
|---|---|---|---|---|
| 7,855,755 | B2 | 12/2010 | Weller et al. | |
| 8,256,821 | B2 | 9/2012 | Lawlor et al. | |
| 8,570,374 | B2 | 10/2013 | Betham et al. | |
| 9,487,159 | B2 | 11/2016 | Achenbach | |
| 9,596,387 | B2 | 3/2017 | Achenbach et al. | |
| 9,871,971 | B2 | 1/2018 | Wang et al. | |
| 9,896,039 | B2 | 2/2018 | Achenbach et al. | |
| 10,071,687 | B2 | 9/2018 | Ihlenburg et al. | |
| 10,099,614 | B2 | 10/2018 | Diessner | |
| 11,130,449 | B2 * | 9/2021 | Hallack | G03B 17/561 |
| 12,145,513 | B2 | 11/2024 | Kasarla | |
| 2007/0273764 | A1 | 11/2007 | Yamada et al. | |
| 2009/0046149 | A1 | 2/2009 | Ohsumi et al. | |
| 2009/0295181 | A1 | 12/2009 | Lawlor et al. | |
| 2012/0207461 | A1 | 8/2012 | Okuda | |
| 2014/0160284 | A1 | 6/2014 | Achenbach et al. | |
| 2014/0226012 | A1 | 8/2014 | Achenbach | |
| 2015/0015713 | A1 | 1/2015 | Wang et al. | |
| 2015/0327398 | A1 | 11/2015 | Achenbach et al. | |
| 2016/0332584 | A1 | 11/2016 | Yasuhara | |
| 2016/0375821 | A1 * | 12/2016 | Schofield | G06V 20/584 701/36 |
| 2019/0389383 | A1 * | 12/2019 | Yajima | B60R 1/04 |
| 2020/0039447 | A1 | 2/2020 | Winden | |
| 2020/0171950 | A1 * | 6/2020 | Wieczorek | B60N 2/143 |
| 2022/0161738 | A1 | 5/2022 | Jeromin | |
| 2022/0363203 | A1 | 11/2022 | Pawelec | |
| 2023/0150225 | A1 | 5/2023 | Mannheim Astete et al. | |

* cited by examiner

VEHICULAR VISION SYSTEM WITH FORWARD-VIEWING CAMERA

CROSS REFERENCE TO RELATED APPLICATIONS

The present application is a continuation of U.S. patent application Ser. No. 18/045,484, filed Oct. 11, 2022, now U.S. Pat. No. 12,145,513, which claims the filing benefits of U.S. provisional application Ser. No. 63/262,363, filed Oct. 11, 2021, which is hereby incorporated herein by reference in its entirety.

FIELD OF THE INVENTION

The present invention relates generally to a vehicle vision system for a vehicle and, more particularly, to a vehicle vision system that utilizes a windshield mounted forward viewing camera at a vehicle.

BACKGROUND OF THE INVENTION

Use of imaging sensors in vehicle imaging systems is common and known. Examples of such known systems are described in U.S. Pat. Nos. 9,896,039; 9,871,971; 9,596,387 and/or 9,487,159, which are hereby incorporated herein by reference in their entireties. Known vehicle imaging systems may have a forward viewing camera mounted at the windshield of a vehicle and viewing forward through the windshield. Windshields are often replaced due to cracking or chipping of the windshield.

SUMMARY OF THE INVENTION

A driving assistance system or vision system or imaging system for a vehicle utilizes a windshield mounted forward viewing camera module having a camera that views forward of the vehicle and captures image data representative of images of scenes exterior and forward of the vehicle. The camera module may be mounted to an in-cabin side of a support structure that has an outer side or surface that is coplanar with an outer side or surface of the windshield. The camera module views through the support structure and forward of the vehicle. The support structure may comprise a portion of the windshield that is separable from another portion of the windshield (with the other portion of the windshield constituting the primary portion of the windshield that is viewed through by the driver or occupant of the vehicle). Thus, the camera module may be mounted to a support structure or portion of the windshield that, when the other portion of the windshield is removed from the vehicle, may remain mounted at the vehicle.

For example, a vehicular vision system includes a camera module mounted at a mounting structure or support structure that is disposed at a windshield of a vehicle equipped with the vehicular vision system. The camera module views through the mounting structure and forward of the vehicle. The camera module includes a camera and circuitry including an image processor. The image processor is operable to process image data captured by the camera. With the windshield mounted at the vehicle and the camera module mounted at the mounting structure, the windshield is separable from the mounting structure so that the windshield is removable from the vehicle without removing the mounting structure from the vehicle and without affecting mounting of the camera module at the mounting structure.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
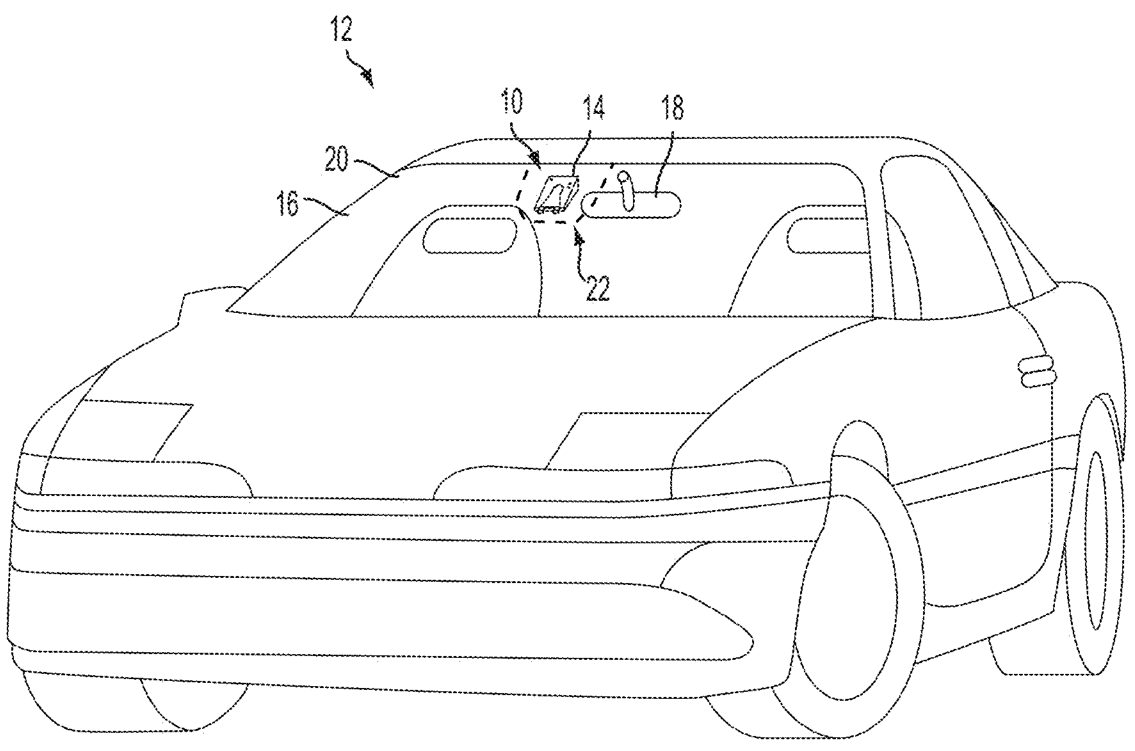
FIG. 1 is a perspective view of a vehicle with a vehicle vision system having a camera mounted at a support at an upper region of a windshield of the vehicle and viewing forward of the vehicle through a transparent portion of the support.

Referring now to the drawings and the illustrative embodiments depicted therein, a vision system 10 for a vehicle 12 includes at least one exterior viewing imaging sensor or camera 14, such as a forward viewing imaging sensor or camera, which may be disposed at and behind the windshield 16 of the vehicle 12 and view forward of the vehicle through the windshield 16 so as to capture image data representative of the scene occurring exterior and forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera module. Optionally, the forward viewing camera 14 may be disposed at the windshield 16 of the vehicle 12 and view through the windshield 16 and forward of the vehicle, such as for a machine vision system (such as for traffic sign recognition, headlamp control, pedestrian detection, collision avoidance, lane marker detection and/or the like). An interior rearview mirror assembly 18 and one or more other sensors capturing sensor data through the windshield and exterior and forward of the vehicle (such as an ambient light sensor, glare light sensor, rain sensor, etc.) may also be disposed at the windshield 16.

The forward viewing camera 14 and/or the interior rearview mirror assembly 18 may be attached to or disposed at a windshield mounted electronics module (WEM) that is mounted to the in-cabin surface of the windshield 16. Furthermore, the camera 14 or mirror assembly 18 or WEM may house or be associated with an electronic control unit (ECU) having electronic circuitry and associated software, where the electronic circuitry includes an image processor or data processor for processing sensor data captured by the camera 14. The data transfer or signal communication from the camera to the ECU may comprise any suitable data or communication link, such as a vehicle network bus or the like of the equipped vehicle.

Traditionally, forward viewing sensors and/or cameras, such as one or more sensors for an advanced driver assist system (ADAS), and/or the interior rearview mirror assembly may be attached or mounted directly to or via mounting structure at the windshield. If the windshield needs to be replaced, such as due to a crack or other damage, some or all of the components attached at the windshield must also be replaced. In other words, because the components are mounted at the windshield, removal of the windshield from the vehicle results in removal of the components from the vehicle. Some sensors that can be remounted at the replacement windshield and reused must be recalibrated before the vehicle can go on the road. Thus, replacement of a traditional windshield having components mounted directly thereat often results in expensive replacement, repair, and/or remounting and recalibration of the components to the replacement windshield.

Figure 2:
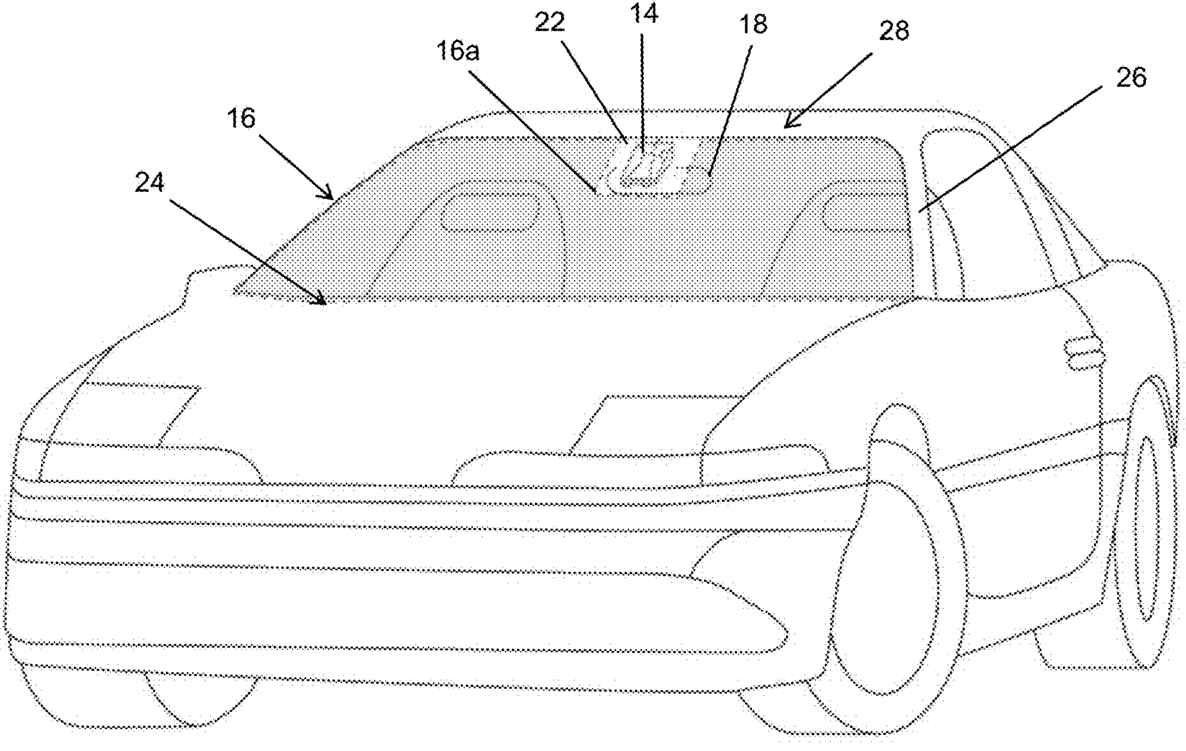
FIG. 2 is a perspective view of the vehicle with the camera mounted at a support that is disposed at an upper recess formed along the upper perimeter edge region of the windshield.

To avoid replacement of the components and/or recalibration of sensors when the windshield needs to be replaced, the camera 14 is mounted at an upper region of the windshield of the vehicle so as to view exterior and forward of the vehicle without being mounted directly at the windshield. As shown in FIG. 2, the camera 14 is mounted at an in-cabin or interior facing surface of mounting or support structure 22, where the camera views through a transparent portion of the support structure 22 exterior and forward of the vehicle. The support structure 22 cooperates with the windshield 16 of the vehicle, where the driver and/or occupant views through the windshield 16 and the camera 14 is mounted at the support structure 22 disposed at an upper region of the windshield 16. The support structure 22 may be attached at the windshield 16 and the windshield 16 and the support structure 22 are separable and may be disposed at and/or removed from the vehicle independent of one another.

The support structure 22 may comprise an outer or exterior-facing surface that is coplanar with an outer or exterior-facing surface of the windshield 16 or the support structure 22 may be positioned behind the windshield 16 so that the outer surface of the support structure 22 faces the in-cabin surface of the windshield 16 and the windshield 16 may have a traditional windshield profile. In other words, the vehicle may include a traditional windshield and the support structure 22 may be separately mounted at the vehicle, such as against the in-cabin surface of the windshield. Thus, the components are mounted at and may view forward of the vehicle through the support element 22 and optionally, also through the windshield 16 of the vehicle. The windshield 16 may be removable and replaceable at the vehicle without requiring removal of the support element 22. For example, the support structure 22 may mount or attach at the windshield and/or at the headliner of the vehicle and the windshield 16 may mount in a substantially traditional manner at the vehicle. Thus, if the windshield 16 must be replaced, such as due to a crack or other damage, the windshield 16 can be replaced without requiring replacement of the support element 22 or the components mounted thereat, and without the need to recalibrate any of the components mounted at the support element 22. This may result in significant cost and labor savings.

As shown in FIG. 1, the support element 22 receives the at least one exterior viewing imaging sensor or camera 14 at an interior facing or in-cabin surface of the support element 22 so that the camera 14 may view through the support element 22 and capture image data representative of the field of view forward of the vehicle. The support element 22 may also receive the interior rearview mirror assembly 18 and any other windshield mounted components at the interior facing surface. The support element 22 may comprise any suitable material configured to receive the sensor and that allows the sensor to view through the support element. For example, the support element 22 may comprise glass (such as the same type of glass as the windshield 16), plastic, acrylic polymer (such as plexiglass), metal, etc. The support element 22 may include a transparent portion (e.g., glass, plastic, acrylic polymer, etc.) that the camera 14 views through, with the transparent portion attached to or integrally formed with a frame portion or structure, which attaches at the headliner and/or at the windshield. For example, the frame portion may include a bracket or other suitable mounting structure for receiving the transparent portion of the support element 22. Optionally, the frame portion circumscribes at least a portion of an outer perimeter or edge region of the transparent portion.

Optionally, the windshield 16 may comprise a two-piece or split windshield, with the windshield 16 comprising a main windshield portion 20 and the support structure 22 (i.e., the support structure 22 is a removable or detachable portion of the windshield 16). The one or more forward viewing sensors and/or cameras and/or the interior rearview mirror assembly (along with any additional windshield mounted components) are attached at the support structure 22 that forms a portion or piece of the windshield 16 separate or split from the main windshield portion 20. In other words, the support structure 22 may provide a pane or portion of glass that cooperates with the main windshield portion 20 to form the windshield 16 of the vehicle. The main windshield portion 20 and the support element 22 may cooperate to provide a continuous or smooth forward facing surface of the vehicle 12 to provide the appearance of a traditional windshield (i.e., the outer surfaces of the main windshield portion 20 and support element 22 may be coplanar), with the main windshield portion 20 forming a substantially larger portion of the windshield 16 than the support element 22.

Optionally, the support element 22 may be disposed at and along and behind the in-cabin surface of the windshield 16 at an upper region of the windshield 16 so that the camera views through the transparent portion of the support element 22 and the windshield 16. The support element 22 may mount or attach at the windshield or may mount or attach at the vehicle in any suitable manner so as to be disposed behind the windshield 16. For example, the frame portion of the support element 22 may extend from the headliner region of the interior cabin of the vehicle and support the transparent portion that is positioned at and behind the windshield with the camera 14 mountably attached at the transparent portion.

Thus, the support element 22 may be mounted at the vehicle or windshield and may extend along the interior facing surface of the windshield 16. For example, the windshield may comprise a traditional windshield and the support element 22 may detachably attach at the in-cabin surface of the windshield or may mount at the headliner above the in-cabin surface of the windshield or otherwise mount at the vehicle so that the vision system mounted at the support element may view through the windshield without permanently mounting to the windshield. For example, the support element 22 may mount to the headliner of the vehicle and extend along and/or below the in-cabin surface of the windshield. Thus, the windshield may be replaceable without requiring removal of the vision system from the vehicle. In such examples, the camera 14 mounted at the support element 22 may view forward of the vehicle through both the support element 22 and the windshield 16.

Figure 3:
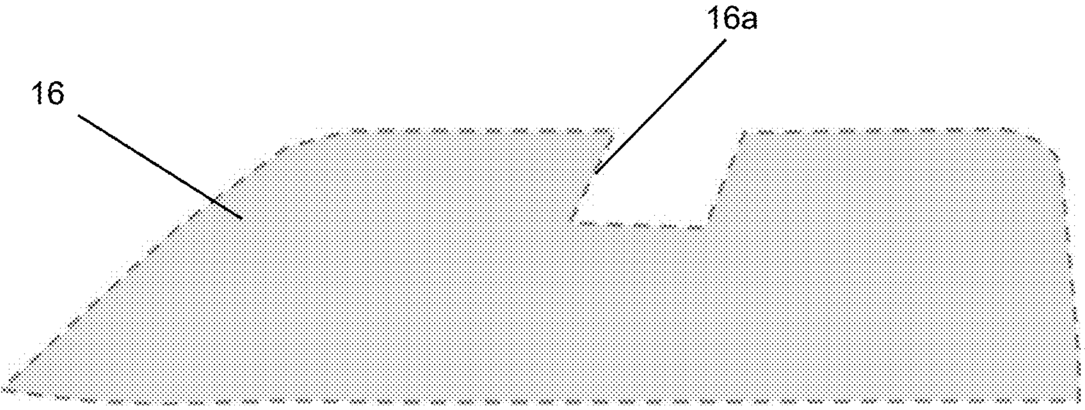
FIG. 3 is a perspective view of the windshield of FIG. 2.

As shown in FIG. 3, the windshield 16 may have a recess or cutout 16*a* along an upper region or edge, with the support element 22 disposed in the recess 16*a* at the upper portion of the windshield. The support element 22 and recess 16*a* may align or otherwise correspond in shape. In other words, the recess 16*a* may be configured to receive the support element 22 therein so that an outer edge of the support element 22 aligns with or engages or conforms to a perimeter edge of the recess 16*a*. Although shown as having a square or rectangular or polygonal perimeter edge, the recess 16*a* may have a rounded or curved perimeter edge or provide a more gradual recess at the upper region of the windshield. Optionally, a seal may be disposed between the support element 22 and the edge of the windshield (at the recess) to secure the support element 22 and windshield 16 to one another and preclude moisture from entering the cabin of the vehicle. For example, the seal may include a rubber gasket or a transparent epoxy or adhesive. Thus, an outer surface of the support element 22 may be exposed exterior the vehicle and optionally coplanar with the outer surface of the windshield 16 so that the camera 14 views through the support element 22 exterior and forward of the vehicle.

The windshield 16 may be attached to the vehicle 12 in a manner similar to a traditional windshield. In other words, the windshield may be mounted at the vehicle, such as at the A-pillars 24, at the hood region 26, and at the headliner or roof region 28 at the front of the vehicle (FIG. 2). Optionally, the support element 22 may be integrally formed with the headliner of the vehicle or otherwise provide a supporting or attaching structure for the windshield. The support element 22 may be attached or mounted at the vehicle at a central region of the headliner or roof 28 of the vehicle 12 (i.e., disposed along a center line of the vehicle between a driver side and passenger side of the vehicle). For example, the support element 22 may be attached at the headliner region 28 of the vehicle, such as via an extension of the headliner 28 or via the frame portion or structure of the support element 22 attached at the headliner 28. Optionally, the support element 22 may be mounted to the headliner region of the vehicle 12 in a similar manner to the windshield (i.e., via attachment to the headliner region 28 at an upper edge or upper portion of the support element) and extend within the cutout 16*a* of the windshield to fill the cutout 16*a*.

Optionally, the frame portion of the support element 22 may extend from the headliner region 28 and receive the transparent portion of the support element 22 to mountably attach the support element 22 at the vehicle. The frame portion may receive the transparent portion of the support element 22 or be integrally formed with the transparent portion of the support element 22 (such as insert molded or coextruded or the like) and the frame portion may extend from the headliner and be disposed interior or exterior of the vehicle. For example, the frame portion may mount or attach at an interior portion of the headliner of the vehicle and extend toward the windshield to support the transparent portion of the support element 22. Thus, the frame portion may attach or be integrally formed at the interior facing surface of the transparent portion of the support element 22. Optionally, the frame portion may extend from an outer surface of the vehicle (such as an upper or outer surface of the roof of the vehicle) and extend toward the windshield to support the transparent portion of the support element. For example, the frame portion may be an extension of the roof of the vehicle or mount at the roof of the vehicle and receive or be integrally formed with an outer surface of the transparent portion of the support element 22. Optionally, the support element 22 may extend from the headliner of the vehicle and may comprise an integrally formed extension of the roof or headliner of the vehicle and the vision system may mount at an interior facing surface of the extension of the roof or headliner and view through the roof or headliner of the vehicle.

The windshield 16 may be mounted or installed at the vehicle in any suitable manner. For example, the support element 22 (with the vision system optionally attached) may be mounted at the vehicle with the windshield subsequently mounted at the vehicle at and around or above the support element 22. Optionally, the windshield and support element 22 may be mountable at the vehicle as a unitary or single component with the windshield separable from the support element 22 and vehicle so that the windshield may be replaced without requiring removal of the support element 22.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a mounting structure configured to mount at a headliner region of a vehicle equipped with the vehicular vision system;

a camera module mounted at the mounting structure;

wherein the camera module comprises a camera and circuitry including an image processor, and wherein the image processor is operable to process image data captured by the camera;

wherein the mounting structure comprises a light transmitting portion, and wherein the camera module is disposed at an in-cabin side of the light transmitting portion of the mounting structure;

wherein, with the mounting structure mounted at the headliner region of the vehicle, and with a windshield mounted at the vehicle, an exterior facing surface of the light transmitting portion of the mounting structure is disposed at an in-cabin side of the windshield so that the camera module disposed at the in-cabin side of the light transmitting portion of the mounting structure views forward of the vehicle through the light transmitting portion of the mounting structure and through the windshield; and wherein, with the mounting structure mounted at the headliner region of the vehicle, and with the windshield mounted at the vehicle, the windshield is separable from the mounting structure so that the windshield is removable from the vehicle without removing the mounting structure from the vehicle and without affecting mounting of the camera module at the mounting structure.

2. The vehicular vision system of claim 1, wherein the light transmitting portion of the mounting structure comprises a glass panel.

3. The vehicular vision system of claim 1, wherein the light transmitting portion of the mounting structure comprises a plastic panel.

4. The vehicular vision system of claim 1, wherein a bracket extends from the headliner region of the vehicle, and wherein the mounting structure is mounted at the bracket.

5. The vehicular vision system of claim 1, wherein the mounting structure extends from and is integrally formed with the headliner region of the vehicle.

6. The vehicular vision system of claim 1, wherein an interior rearview mirror assembly is mounted at the mounting structure.

7. The vehicular vision system of claim 1, wherein the mounting structure comprises a frame portion, and wherein the frame portion is attached at the headliner region of the vehicle, and wherein the camera module is mounted at the in-cabin side of the light transmitting portion of the mounting structure.

8. The vehicular vision system of claim 1, wherein the mounting structure comprises a bracket that mounts at the headliner region of the vehicle and that extends from the headliner region of the vehicle downward and partially along the in-cabin side of the windshield of the vehicle.

9. The vehicular vision system of claim 8, wherein the light transmitting portion of the mounting structure comprises a transparent panel that is attached at the bracket.

10. The vehicular vision system of claim 1, wherein the light transmitting portion of the mounting structure comprises a light transmitting panel, and wherein the exterior facing surface of the light transmitting panel faces the in-cabin side of the windshield of the vehicle.

11. The vehicular vision system of claim 1, wherein the light transmitting portion of the mounting structure comprises a light transmitting panel, and wherein the exterior facing surface of the light transmitting panel contacts the in-cabin side of the windshield of the vehicle.

12. A vehicular vision system, the vehicular vision system comprising:

a mounting structure configured to mount at a headliner region of a vehicle equipped with the vehicular vision system;

a camera module mounted at the mounting structure;

wherein the camera module comprises a camera and circuitry including an image processor, and wherein the image processor is operable to process image data captured by the camera;

wherein the mounting structure comprises a bracket that mounts at the headliner region of the vehicle and that extends from the headliner region of the vehicle downward and partially along an in-cabin side of a windshield of the vehicle;

wherein the mounting structure comprises a light transmitting panel attached at the bracket, and wherein the camera module is disposed at an in-cabin side of the light transmitting panel of the mounting structure;

wherein the light transmitting panel of the mounting structure comprises one selected from the group consisting of (i) a transparent glass panel and (ii) a transparent plastic panel;

wherein, with the mounting structure mounted at the headliner region of the vehicle, and with the windshield mounted at the vehicle, an exterior facing surface of the light transmitting panel of the mounting structure is disposed at the in-cabin side of the windshield so that the camera module disposed at the in-cabin side of the light transmitting panel of the mounting structure views forward of the vehicle through the light transmitting panel of the mounting structure and through the windshield; and wherein, with the mounting structure mounted at the headliner region of the vehicle, and with the windshield mounted at the vehicle, the windshield is separable from the mounting structure so that the windshield is removable from the vehicle without removing the mounting structure from the vehicle and without affecting mounting of the camera module at the mounting structure.

13. The vehicular vision system of claim 12, wherein an interior rearview mirror assembly is mounted at the mounting structure.

14. The vehicular vision system of claim 12, wherein the camera module is mounted at the in-cabin side of the light transmitting panel of the mounting structure.

15. The vehicular vision system of claim 12, wherein the exterior facing surface of the light transmitting panel contacts the in-cabin side of the windshield of the vehicle.

16. A vehicular vision system, the vehicular vision system comprising:

a mounting structure configured to mount at a headliner region of a vehicle equipped with the vehicular vision system;

a camera module mounted at the mounting structure;

wherein the camera module comprises a camera and circuitry including an image processor, and wherein the image processor is operable to process image data captured by the camera;

wherein the mounting structure comprises a bracket that mounts at the headliner region of the vehicle;

wherein the mounting structure comprises a light transmitting panel attached at the bracket, and wherein the camera module is disposed at an in-cabin side of the light transmitting panel of the mounting structure;

wherein, with the mounting structure mounted at the headliner region of the vehicle, and with a windshield mounted at the vehicle, an exterior facing surface of the light transmitting panel of the mounting structure is disposed at an in-cabin side of the windshield so that the camera module disposed at the in-cabin side of the light transmitting panel of the mounting structure views forward of the vehicle through the light transmitting panel of the mounting structure and through the windshield; and wherein, with the mounting structure mounted at the headliner region of the vehicle, and with the windshield mounted at the vehicle, the windshield is separable from the mounting structure so that the windshield is removable from the vehicle without removing the mounting structure from the vehicle and without affecting mounting of the camera module at the mounting structure.

17. The vehicular vision system of claim 16, wherein the light transmitting panel of the mounting structure comprises one selected from the group consisting of (i) a glass panel and (ii) a plastic panel.

18. The vehicular vision system of claim 16, wherein an interior rearview mirror assembly is mounted at the mounting structure.

19. The vehicular vision system of claim 16, wherein the bracket extends from the headliner region of the vehicle downward and partially along the in-cabin side of the windshield of the vehicle.

20. The vehicular vision system of claim 16, wherein the exterior facing surface of the light transmitting panel contacts the in-cabin side of the windshield of the vehicle.

* * * * *